United States Patent Office 2,741,622
Patented Apr. 10, 1956

2,741,622

PREPARATION OF THIOPHENE-2-ALDEHYDES

Dorothy J. Brockmeyer, St. Louis, and Ferdinand C. Meyer, Kirkwood, Mo., assignors to Monsanto Chemical Company, St. Louis, Mo., a corporation of Delaware No Drawing. Application December 3, 1951,
Serial No. 259,718

6 Claims. (Cl. 260—332.3)

This invention relates to improvements in the method of making thiophene-2-aldehydes.

Thiophene-2-aldehydes are of considerable importance in organic synthesis and although many methods for their preparation have been suggested and tried, not one has been found entirely satisfactory. One of the most feasible of the processes tried is the direct acylation of a thiophene compound having a free ortho position, which process essentially comprises the refluxing of a mixture containing the thiophene compound, N-methylformanilide and a phosphorusoxyhalide catalyst until the evolution of hydrogen halide gas begins, the thiophene-2-aldehyde being then isolated by steam distilling at atmospheric pressure. The disadvantages of this method lay in the hazards involved in operating under reflux conditions, which hazards are accentuated by the exothermic nature of the acylation reaction, the low yields of the desired thiophene-2-aldehyde obtained, and the formation of large amounts of by-products which are difficult and expensive to remove.

It is an object of this invention to provide a method for obtaining high yields of a thiophene-2-aldehyde in the acylation of a thiophene compound having a free ortho position with N-methylformanilide in the presence of a phosphorusoxyhalide catalyst.

It is also an object of this invention to provide a method for carrying out the acylation of a thiophene compound having a free ortho position with N-methylformanilide in the presence of a phosphorusoxyhalide catalyst whereby a thiophene-2-aldehyde is obtained in a purer state in a convenient and inexpensive manner.

These and other objects which will appear hereinafter are attained by the addition of the phosphorusoxyhalide catalyst to the mixture of a thiophene compound having a free ortho position and N-methylformanilide while maintaining the temperature of the mix during the catalyst addition and throughout the course of the reaction below reflux temperature.

In carrying out the process of this invention it is necessary to add the phosphorusoxyhalide catalyst to the mixture of the thiophene compound and N-methylformanilide at a temperature below the reflux temperature and maintain the temperature of the reaction below said reflux temperature until the reaction is complete. The cessation of heat evolution is indicative of completion of the reaction. The preferred operating temperature range is about 40 to 85° C. and it has been found that optimum results are obtained at about a 50–70° C. operating range.

Any of the well known conventional separation methods may be employed for isolating the thiophene-2-aldehyde compound from the resultant reaction mass obtained by means of the aforedescribed new and improved process. However, prior to the separation operation it has been found particularly desirable to water-quench the reaction mass, i. e., add the reaction mass to water, while maintaining the temperature during the quenching operation below about 50° C. Upon completion of the hydrolysis of the phosphorusoxyhalide catalyst the desired thiophene-2-aldehyde may be conveniently isolated by steam distillation at atmospheric pressure. By carrying out the steam distillation operation under vacuum while maintaining the temperature of the mix below about 60° C., and preferably at 45–55° C., substantially higher yields of the thiophene-2-aldehyde compound are obtained.

Although vacuum steam distillation of the reaction mass in many instances produces satisfactory results, there are some decomposition products formed and it has been found particularly desirable in the obtainment of high yields of a pure product to neutralize the aforedescribed water-quenched reaction mass with an alkaline material, such as sodium hydroxide, potassium hydroxide, calcium hydroxide, etc., as for example to a pH of about 1–2, while maintaining the temperature below about 50° C., and subsequently isolate the thiophene-2-aldehyde compound by extracting the neutralized mix with a suitable water-immiscible non-polar solvent such as toluene, benzene, xylene or the various petroleum hydrocarbons such as hexane, heptane, octane, kerosene, etc.

As illustrative of the process of this invention are the following:

*Example I*

In a suitable reaction vessel 84 parts by weight of thiophene and 168 parts by weight of N-methylformanilide are intimately mixed and heated to about 60° C. While maintaining the temperature at about 55–65° C. and constantly agitating, 184 parts by weight of phosphorusoxychloride is added to the reactant mix. Upon completion of the catalyst addition the reaction mix is maintained at 55–65° C. until it is no longer exothermic and then allowed to cool. The reaction mix so obtained is then added to about 500 parts by weight water while keeping the temperature below about 40° C. Upon complete hydrolysis of the phosphorusoxychloride catalyst the mix is steam distilled at atmospheric pressure. The distilled yellow oil is then washed with water and a yield of approximately 75% of 96% pure thiophene-2-aldehyde is obtained.

In contrast to the above a yield of but about 60% thiophene-2-aldehyde is obtained upon carrying out the acylation reaction, employing the same weights of reagents and catalyst, at the reflux temperature.

*Example II*

In a suitable reaction vessel 84 parts by weight of thiophene and 168 parts by weight of N-methylformanilide are intimately mixed and heated to about 60° C. While maintaining the temperature at 55–65° C. and constantly agitating, 184 parts by weight of phosphorusoxychloride is added to the reactant mix. Upon completion of the phosphorusoxychloride addition the reaction mix is maintained at 55–65° C. until it is no longer exothermic and then allowed to cool. The reaction mix so obtained is then added to about 500 parts by weight water while keeping the temperature below about 40° C. Upon complete hydrolysis of the phosphorusoxychloride catalyst, sufficient sodium hydroxide is added in the form of an aqueous solution to raise the pH of the mix to about 1.5. Thereupon the mix is extracted with two 217 parts by weight portions of toluene. Thereafter the toluene extract is washed with water and the toluene stripped off. A yield of approximately 95 parts by weight of pure thiophene-2-aldehyde, B. P. 82–85° C./12 mm., $N_D^{25}$ 1.5888, is obtained, which corresponds to a percentage yield of about 87.5% based upon thiophene charged.

*Example III*

In a suitable reaction vessel 84 parts by weight of thiophene and 168 parts by weight of N-methylformanilide are intimately mixed and heated to about 60° C. While maintaining the temperature at 55–65° C. and constantly agitating 184 parts by weight of phosphorusoxychloride is added to the reactant mix. Upon completion of the phosphorusoxychloride addition the reaction mix is maintained at 55–65° C. until it is no longer exothermic and then allowed to cool. The reaction mix so obtained is then added to 600 parts by weight water while keeping the temperature below about 45° C. Upon complete hydrolysis of the phosphorusoxychloride the thiophene-2-aldehyde is steam distilled out of the solution under vacuum, maintaining the temperature at 45–55° C. throughout the vacuum distillation operation. The distilled yellow oil is then washed with water and a yield of approximately 87.5% of 99% pure thiophene-2-aldehyde based upon thiophene charged is obtained.

Example IV

In a suitable reaction vessel 119 parts by weight of 2-chlorothiophene and 168 parts by weight of N-methylformanilide are intimately mixed and heated to about 60° C. While maintaining the temperature at 55–65° C. and constantly agitating, 184 parts by weight of phosphorusoxychloride is added to the reactant mix. Upon completion of the phosphorusoxychloride addition the reaction mix is maintained at 55–65° C. until it is no longer exothermic and then allowed to cool. The reaction mix so obtained is then added to about 500 parts by weight water while keeping the temperature below about 40° C. Upon complete hydrolysis of the phosphorusoxychloride catalyst, sufficient sodium hydroxide is added in the form of an aqueous solution to raise the pH of the mix to about 1.5. Thereupon the mix is extracted with two 200 parts by weight portions of xylene. Thereafter the xylene extract is washed with water and the xylene stripped off. A yield of approximately 128 parts by weight of pure 5-chloro-thiophene-2-aldehyde, B. P. 99° C./21 mm., $N_D^{25}$ 1.5963 is obtained, which corresponds to a percentage yield of about 87% based upon 5-chloro-thiophene charged.

Example V

In a suitable reaction vessel 96 parts by weight of 2-methyl-thiophene and 168 parts by weight of N-methylformanilide are intimately mixed and heated to about 60° C. While maintaining the temperature at 60–70° C. and constantly agitating, 184 parts by weight of phosphorusoxychloride is added to the reactant mix. Upon completion of the phosphorusoxychloride addition the reaction mix is maintained at 60–70° C. until it is no longer exothermic and then allowed to cool. The reaction mix so obtained is then added to about 500 parts by weight water while keeping the temperature below about 50° C. Upon complete hydrolysis of the phosphorusoxychloride catalyst the mix is neutralized with calcium hydroxide the resultant pH being about 1.5. Thereupon the mix is extracted with two 200 parts by weight portions of benzene. Thereafter the benzene extract is washed with water and the benzene stripped off. An excellent yield of pure 5-methyl-thiophene-2-aldehyde is obtained.

Example VI

In a suitable reaction vessel 96 parts by weight of 3-methyl-thiophene and 168 parts by weight of N-methylformanilide are intimately mixed and heated to about 70° C. While maintaining the temperature at 65–75° C. and constantly agitating, 184 parts by weight of phosphorusoxychloride is added to the reactant mix. Upon completion of the phosphorusoxychloride addition the reaction mix is maintained at 65–75° C. until it is no longer exothermic and then allowed to cool. The reaction mix so obtained is then added to about 500 parts by weight water while keeping the temperature below about 50° C. Upon complete hydrolysis of the phosphorusoxychloride catalyst the mix is neutralized with sodium hydroxide, the resultant pH being about 1.5. Thereupon the mix is extracted with two 217 parts by weight portions of toluene. Thereafter the toluene extract is washed with water and the toluene stripped off. A good yield of pure 3-methyl-thiophene-2-aldehyde is obtained.

While the foregoing examples illustrate the invention, other thiophene-2-aldehydes than the aforedescribed may be prepared in accordance with the process of this invention. For example, the corresponding halogen and aliphatic substituted thiophene-2-aldehydes are obtained from such thiophene compounds as 3-ethylthiophene, 3-n-propylthiophene, 3-isobutylthiophene, 3,4-dimethylthiophene, 2,3-dimethylthiophene, 3-chlorothiophene, 3-bromothiophene, 2-bromothiophene, 2-iodothiophene, and the like, in improved yields and purity.

What is claimed is:

1. In the process of making a thiophene-2-aldehyde by the acylation of a thiophene compound having a free ortho position with N-methylformanilide, the steps which comprise adding phosphorusoxychloride to a preformed mixture of the thiophene compound and N-methylformanilide while maintaining the temperature of the reactant mix during the phosphorusoxychloride addition and throughout the course of the reaction below the refluxing temperature of the reaction mix, said temperature being in the range of about 50 to 70° C., and hydrolyzing the phosphorusoxychloride by adding the reaction mass so obtained to water while maintaining the temperature during the addition and throughout the hydrolysis below about 50° C.

2. In the process of making thiophene-2-aldehyde by the acylation of thiophene with N-methylformanilide, the steps which comprise adding phosphorusoxychloride to a preformed mixture of thiophene and N-methylformanilide while maintaining the temperature of the reactant mix during the phosphorusoxychloride addition and thoughout the course of the reaction at about 50 to 70° C., hydrolyzing the phosphorusoxychloride by adding the reaction mass so obtained to water while maintaining the temperature during the addition and throughout the hydrolysis below about 50° C., and recovering the thiophene-2-aldehyde from the water-quenched mass by steam distilling under vacuum maintaining the temperature below about 60° C.

3. In the process of making thiophene-2-aldehyde by the acylation of thiophene with N-methylformanilide, the steps which comprise adding phosphorusoxychloride to a preformed mixture of thiophene and N-methylformanilide while maintaining the temperature of the reactant mix during the phosphorusoxychloride addition and throughout the course of the reaction at about 50 to 70° C., hydrolyzing the phosphorusoxychloride by adding the reaction mass so obtained to water while maintaining the temperature during the addition and throughout the hydrolysis below about 50° C., and recovering thiophene-2-aldehyde from the water-quenched mass by steam distilling under vacuum maintaining the temperature at about 45–55° C.

4. In the process of making thiophene-2-aldehyde by the acylation of thiophene with N-methylformanilide, the steps which comprise adding phosphorusoxychloride to a preformed mixture of thiophene and N-methylformanilide while maintaining the temperature of the reactant mix during the phosphorusoxychloride addition and throughout the course of the reaction at about 50 to 70° C., hydrolyzing the phosphorusoxychloride by adding the reaction mass so obtained to water while maintaining the temperature during the addition and throughout the hydrolysis below about 50° C., neutralizing the water-quenched mass to a pH of about 1.5 and separating thiophene-2-aldehyde by extracting the neutralized mix with toluene.

5. In the process of making a thiophene-2-aldehyde by the acylation of a thiophene compound having a free ortho position with N-methylformanilide, the steps which comprise adding phosphorusoxychloride to a preformed mixture of the thiophene compound and N-methylformanilide while maintaining the temperature of the reaction mix during the phosphorusoxychloride addition and throughout the course of the reaction below the refluxing temperature of the reaction mix said temperature being in the range of about 50 to 70° C., hydrolyzing the phosphorusoxychloride by adding the reaction mass so obtained to water while maintaining the temperature during the addition and throughout the hydrolysis below about 50° C., and recovering the thiophene-2-aldehyde compound so produced, the process of recovering said thiophene-2-aldehyde compound being selected from the group consisting of (a) neutralizing the water-quenched mass to a pH of 1 to 2 and separating the thiophene-2-aldehyde compound by extracting the neutralized mass with a water-immiscible non-polar solvent for said thiophene-2-aldehyde compound and (b) steam distilling the water-quenched mass under vacuum maintaining the temperature below about 60° C.

6. In the process of making 5-chloro-thiophene-2-aldehyde by the acylation of ortho-chlorthiophene with N-methylformanilide, the steps which comprise adding phosphorusoxychloride to a preformed mixture of ortho-chlorthiophene and N-methylformanilide while maintaining the temperature of the reactant mix during the phosphorusoxychloride addition and throughout the course of the reaction at about 50 to 70° C., hydrolyzing the phosphorusoxychloride by adding the reaction mass so obtained to water while maintaining the temperature during the addition and throughout the hydrolysis below about 50° C., neutralizing the water-quenched mass to a pH of about 1.5 and separating 5-chloro-thiophene-2-aldehyde by extracting the neutralized mix with xylene.

References Cited in the file of this patent
UNITED STATES PATENTS

| | | |
|---|---|---|
| 2,581,009 | Emerson et al. | Jan. 1, 1952 |
| 2,601,479 | Weston | June 24, 1952 |

OTHER REFERENCES

King et al.: J. Org. Chem. 13, 635–40 (1948).
Weston: JACS 72:1422–23.